US008192032B2

(12) United States Patent
Takahashi et al.

(10) Patent No.: US 8,192,032 B2
(45) Date of Patent: Jun. 5, 2012

(54) ASPHERIC MIRROR, PROJECTION-TYPE IMAGE DISPLAYING APPARATUS AND METHOD OF PRODUCING PROJECTION-TYPE IMAGE DISPLAYING APPARATUS

(75) Inventors: Shinji Takahashi, Yokohama (JP); Hiroyuki Takada, Yokohama (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 910 days.

(21) Appl. No.: 11/810,771

(22) Filed: Jun. 7, 2007

(65) Prior Publication Data

US 2007/0285811 A1 Dec. 13, 2007

(30) Foreign Application Priority Data

Jun. 9, 2006 (JP) .................. 2006-160713

(51) Int. Cl.
*G03B 21/28* (2006.01)
*G02B 5/08* (2006.01)
*G02B 7/182* (2006.01)
(52) U.S. Cl. ............. 353/98; 353/99; 359/850; 359/851
(58) Field of Classification Search .............. 353/37–38, 353/50–51, 77–78, 98–99, 122; 359/838, 359/858–859, 863, 868–869, 850–851
See application file for complete search history.

(56) References Cited

U.S. PATENT DOCUMENTS

| 4,971,436 | A | * | 11/1990 | Aoki et al. | ........................ 353/31 |
| 5,477,394 | A | * | 12/1995 | Shibazaki | ...................... 359/858 |
| 6,022,114 | A | * | 2/2000 | Foo | .............................. 359/853 |
| 6,612,704 | B2 | * | 9/2003 | Ogawa | ........................... 353/99 |
| 7,631,989 | B2 | * | 12/2009 | Li | ................................. 362/298 |
| 2003/0202161 | A1 | * | 10/2003 | Konno et al. | .................... 353/70 |
| 2007/0184368 | A1 | * | 8/2007 | Nishikawa et al. | ............ 430/30 |

FOREIGN PATENT DOCUMENTS

| JP | 2004-093944 | 3/2004 |
| JP | 2006-018083 | 1/2006 |

* cited by examiner

*Primary Examiner* — Tony Ko
*Assistant Examiner* — Jori S Reilly-Diakun
(74) *Attorney, Agent, or Firm* — Renner, Kenner, Greive, Bobak, Taylor & Weber

(57) ABSTRACT

An aspheric mirror has an aspheric reflective surface symmetrical with respect to an optical axis that goes through the reflective surface and a reference plane provided in the reflective surface. The optical axis may go through the reflective surface at a non-center position on the reflective surface. The reference plane may be perpendicular to the optical axis. The reference plane may be flat enough for a beam to be reflected from the reference plane in almost specular reflection when emitted to the reference plane.

8 Claims, 7 Drawing Sheets

ASPHERIC MIRROR, PROJECTION-TYPE IMAGE DISPLAYING APPARATUS AND METHOD OF PRODUCING PROJECTION-TYPE IMAGE DISPLAYING APPARATUS

CROSS-REFERENCE TO RELATED APPLICATIONS

This application is based on and claims the benefit of priority from the prior Japanese Patent Application No. 2006-160713 filed on Jun. 9, 2006, the entire content of which is incorporated herein by reference.

BACKGROUND OF THE INVENTION

The present invention relates to an aspheric mirror, a projection-type image displaying apparatus and a method of producing a projection-type image displaying apparatus.

An aspheric mirror having an aspheric reflective surface has been used for a variety of optical equipment. It has also recently been used for projection-type image displaying apparatuses enabling displaying of large images, such as, a front projector and a rear-projection TV.

The Un-examined Japanese Patent Publication No. 2006-18083 discloses a rear-projection-type image displaying apparatus having an aspheric mirror. The Un-examined Japanese Patent Publication No. 2004-93944 discloses optical-axis adjustments for an aspheric mirror.

Projection-type image displaying apparatuses with an aspheric mirror have a displaying mechanism as follows: Light from a light source is emitted to an aspheric mirror, carrying an image, via an image displaying device, such as, a liquid crystal image displaying device. The image is reflected from a reflecting surface formed on the aspheric mirror and projected onto a screen, as a large image.

The reflecting surface formed on the aspheric mirror is a portion of an aspheric shape symmetrical with respect to an optical axis. The location and orientation of the optical axis are thus difficult to find out from its shape. The aspheric mirror is required to be precisely mounted on a specific location given in design along an optical path and with respect to an optical block that emits light.

An image projected onto a screen is more distorted or has more non-uniform resolution as the location at which the aspheric mirror is actually mounted is more deviated from the location given in design, thus suffering from lowered quality. This is more remarkable for a larger screen on which images are enlarged at a larger scale.

There is thus a demand for higher accuracy in installation of the aspheric mirror.

Disclosed in Un-examined Japanese Patent Publication No. 2006-18083 is installation of an aspheric mirror in a rear-projection-type image displaying apparatus in accordance with a positional relationship between support members and attachments fixed at the side faces of the aspheric mirror and the corresponding parts at the apparatus' side.

In this scheme, however, the aspheric mirror is not installed in the displaying apparatus with no direct respect to the location and orientation of the optical axis of the mirror. It is difficult to accurately place the reflecting surface of the mirror at a desired location and at a desired angle due to deformation of the mirror, variation in size of support members and attachments, etc., and inconsistency in assembly, resulting in distortion or non-uniform resolution of images on a screen.

The installation scheme also causes variation in location of the aspheric mirror in mass-production of rear-projection-type image displaying apparatuses. Even a slight variation of the mirror location in each apparatus could cause quality gap among the apparatuses.

Disclosed in Un-examined Japanese Patent Publication No. 2004-93944 is optical-axis adjustments for an aspheric mirror with analysis of images reflected from the mirror mounted on a stage rotating by a small angle while parallel beams are emitted to the mirror. It is difficult to adopt such complex adjustments and analysis to optical-axis adjustments for aspheric mirrors in projection-type image displaying apparatuses.

SUMMARY OF THE INVENTION

A purpose of the present invention is to provide an aspheric mirror precisely mountable at a desired location and angle with less variation.

Another purpose of the present invention is to provide a projection-type image displaying apparatus and a production method thereof, with an aspheric mirror precisely mountable at a desired location and angle with less variation, thus giving high-quality images.

The present invention provides an aspheric mirror comprising: an aspheric reflective surface symmetrical with respect to an optical axis that goes through the reflective surface; and a reference plane provided in the reflective surface.

Moreover, the present invention provides a projection-type image displaying apparatus comprising: an optical block to emit a beam carrying an image through optical modulation; an aspheric mirror having an aspheric reflective surface symmetrical with respect to an optical axis that goes through the reflective surface and having a reference plane provided in the reflective surface, the optical block and the mirror being arranged for the beam to be emitted to the mirror and reflected from the reflective surface; and a screen to display the image carried by the beam reflected from the reflective surface.

Furthermore, the present invention provides a method of producing a projection-type image displaying apparatus comprising the steps of: placing an optical block on a reference plane of a support base; placing an aspheric mirror on the reference plane of the support base, the mirror having an aspheric reflective surface symmetrical with respect to an optical axis that goes through the reflective surface at a non-center position on the reflective surface and having a reference plane provided in the reflective surface, the reference plane of the mirror being perpendicular to the optical axis, the reference plane of the mirror being flat enough for a beam to be reflected from the reference plane in almost specular reflection when emitted to the reference plane; emitting a specific beam to the reference plane of the mirror as being parallel to the reference plane of the support base at a specific height from the reference plane of the support base and as being perpendicular to a plane that involves an optical axis of the optical block and is vertical to the reference plane of the support base so that an axis of the specific beam agrees with an optical axis given in design for the mirror; measuring inclination of the reference plane of the mirror with respect to the reference plane of the support base based on the specific beam reflected from the reference plane of the mirror in almost specular reflection after emitted to the reference plane of the mirror; adjusting the aspheric mirror on the reference plane of the support base with respect to the optical block placed on the reference plane of the support base so that there is no inclination for the reference plane of the mirror with respect to the reference plane of the support base.

Still furthermore, the present invention provides a method of producing a projection-type image displaying apparatus comprising the steps of: placing an optical block on a reference plane of a support base in a housing having a screen and a panel under the screen, the optical block having an optical lens via which a beam is to be emitted out; placing an aspheric mirror on the reference plane of the support base, the mirror having an aspheric reflective surface symmetrical with respect to an optical axis that goes through the reflective surface at a non-center position on the reflective surface and having a reference plane provided in the reflective surface, the reference plane of the mirror being perpendicular to the optical axis of the mirror, the reference plane of the mirror being flat enough for a beam to be reflected from the reference plane of the mirror in almost specular reflection when emitted to the reference plane of the mirror; arranging the optical block and the aspheric mirror on the reference plane of the support base so that an optical axis of the optical block intersects with the reference plane of the mirror; placing a mask in front of the optical lens in the optical block so that a beam emitted from the optical block goes forward only in a small zone involving the optical axis of the optical block; emitting a specific beam from the optical block via the optical lens and through the mask so that the specific beam goes forward along the optical axis of the optical block, thus a beam spot being formed on the panel after the specific beam is reflected from the reference plane of the mirror in almost specular reflection; and adjusting the aspheric mirror on the reference plane of the support base with respect to the optical block placed on the reference plane of the support base so that a position of the beam spot agrees with a reference position given in design on the panel.

DETAILED DESCRIPTION OF PREFERRED EMBODIMENTS

Figure 1:
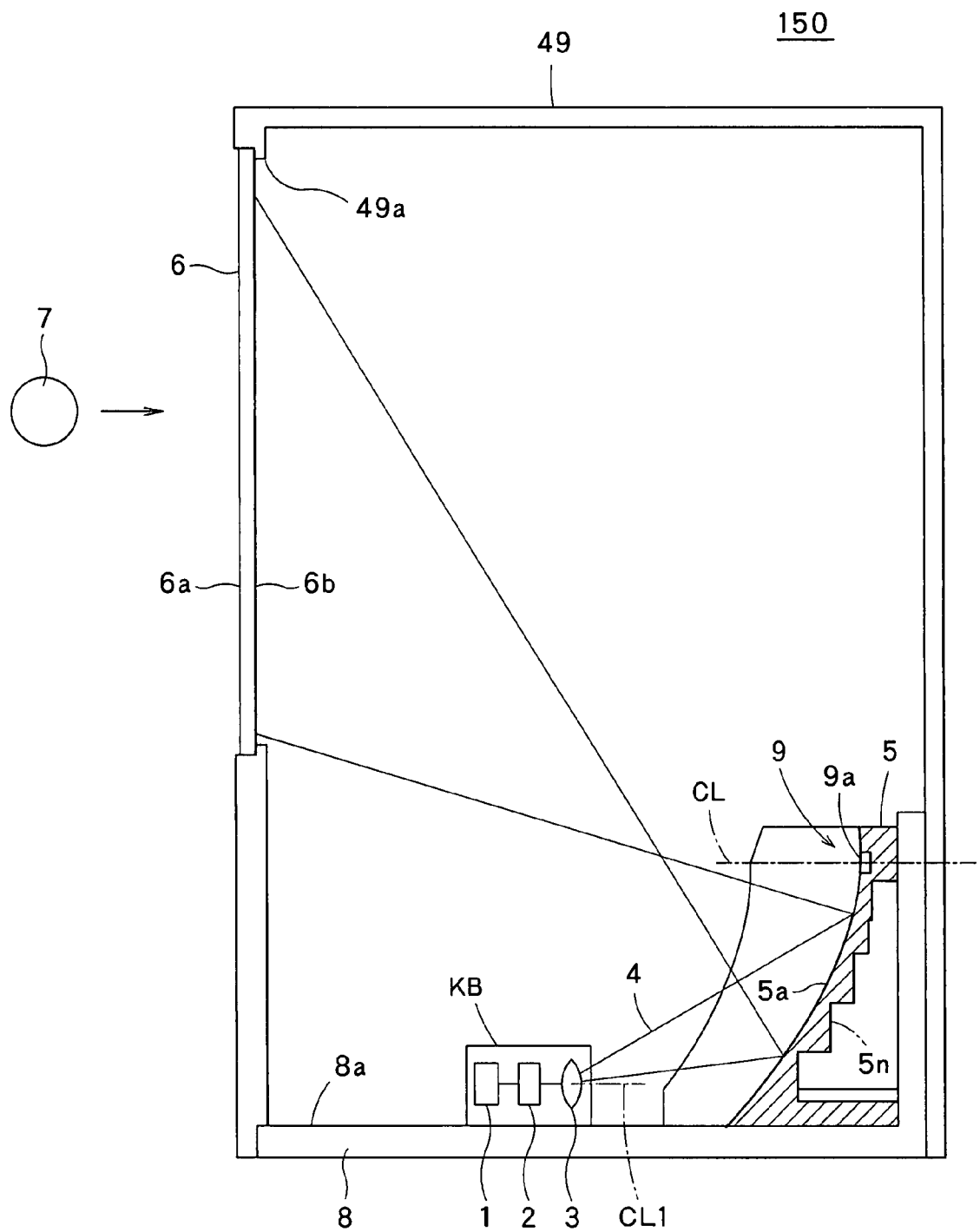
FIG. 1 shows a schematic illustration of a preferred embodiment of a projection-type image displaying apparatus according to the present invention.

FIG. 1 shows a preferred embodiment of a projection-type image displaying apparatus 150, according to the present invention, equipped at least with an optical block KB, an aspheric mirror 5 and a screen 6. The screen 6 is fit in an opening 49a of a housing 49.

The aspheric mirror 5 is situated in an optical path between the optical block KB and the screen 6. The mirror 5 is supported by a supporting base 8 and positioned at high accuracy with respect to the block KB. The block KB is also supported by the base 8.

The optical block KB is equipped at least with a light source 1, such as, a lamp or an LED, a transparent-type liquid crystal displaying device 2, and an optical lens 3.

The light emitted by the light source 1 is transformed into a fan beam 4 with a specific angle through the displaying device 2 and the optical lens 3. The beam 4 is adjusted so that it goes forward in a zone that does not include an optical axis CL1 of the lens 3, or the zone above the axis CL1 in FIG. 1.

A video signal is supplied to the liquid crystal displaying device 2 from a video signal processor (not shown). The signal is optically modulated by the displaying device 2. The fan beam 4 carrying an image corresponding to the video signal is then emitted from the optical block KB. The image may be a moving or still image.

Besides the transparent type, the displaying device 2 may be a reflective-type liquid crystal displaying device LCOS (Liquid Crystal on Silicon), such as, D-ILA (Direct-Drive Image Light Amplifier), a registered trademark.

In case of the reflective-type liquid crystal displaying device, light from the light source 1 is emitted to the LCOS 2 and reflected therefrom, and transformed into the fan beam 4 via the optical lens 3 which is then emitted out with images from the optical block KB.

The fan beam 4 emitted from the optical block KB reaches a reflective surface 5a formed on an aspheric surface of the mirror 5, a section of a concave surface, and reflected therefrom. The reflected beam 4 is projected onto a rear side 6b of the screen 6 (the right side surface of the screen 6 in FIG. 1), with an enlarged image displayed thereon. The concave reflective surface 5a gives an enlarged image of reversed left to right and top to bottom on the rear side 6b of the screen 6. A viewer 7 views the enlarged image at a front side 6a of the screen 6.

The reflective surface 5a may be convex, instead of concave, which will be discussed later.

The aspheric mirror 5 (a first embodiment of this type of mirror in this invention) will be explained further in detail with respect to FIG. 2.

The aspheric mirror 5 can be cut from a lump of metal, for example, a metallic material for injection molding. The mirror 5 can be produced with STAVAX (a registered trademark) that is a stainless tool steel. The STAVAX is plated with NiP (an alloy of nickel and phosphorus) after semi finishing, followed by finishing the reflective mirror surface. NiP plating offers good machinability, good corrosion resistance and higher reflectivity.

Figure 2:
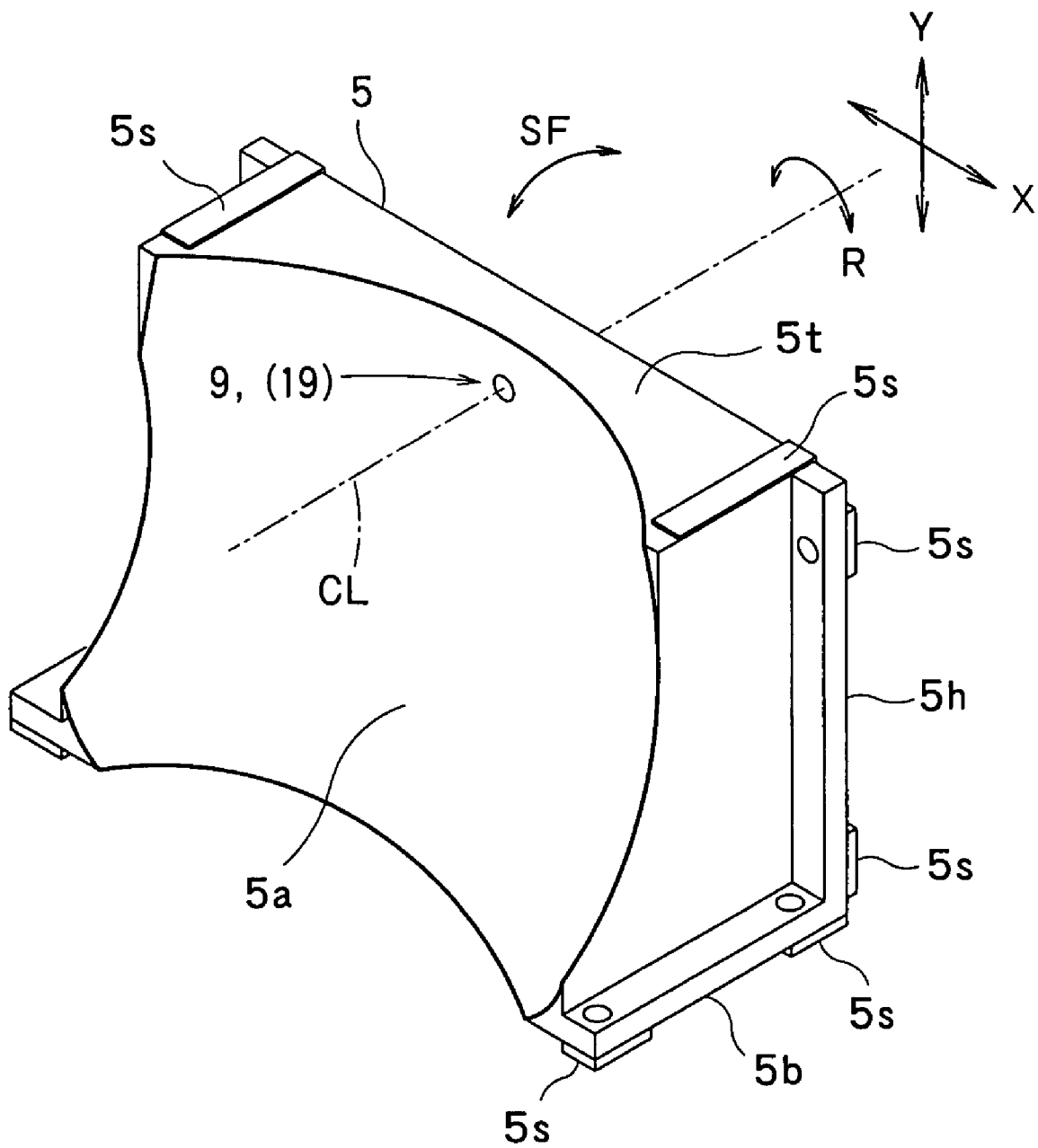
FIG. 2 shows an outline perspective illustration of a first embodiment of an aspheric mirror according to the present invention.

As shown in FIG. 2, the aspheric mirror 5 has a concave surface, on the front side, that is the reflective surface 5a. The mirror 5 also has a rear surface 5h, the opposite of the reflective surface 5a, a top surface 5t and a bottom surface 5b. Provided on each of the surfaces 5h, 5t and 5b is a highly-precisely-formed supporting surface 5s that is touched with a corresponding member (not shown) in positioning in assembly. The rear surface 5h is provided with a punched member 5n that is a stepped concave section, as shown in FIG. 1.

The aspheric mirror 5 is supported by the supporting base 8 which is achieved by a known supporting mechanism in which the mirror 5 is rotatable about an optical axis CL in directions of R, movable in vertical and horizontal directions X and Y, and tiltable in directions SF, within a specific range in each direction, and mountable in an optimum position or posture, in FIG. 2.

The reflective surface 5a is formed into a mirror, as disclosed above, with semi finishing by cutting followed by mirror finishing with lapping. However, the surface 5a can be formed into a mirror in a cutting process with no additional processes.

The top and bottom surfaces 5t and 5b are arranged as parallel to each other, with the optical axis CL on the reflective surface 5a, parallel to these surfaces.

The reflective surface 5a is a concave surface having the optical axis CL at a non-center position cut away from an aspheric surface symmetrical with respect to the optical axis CL.

Figure 3:
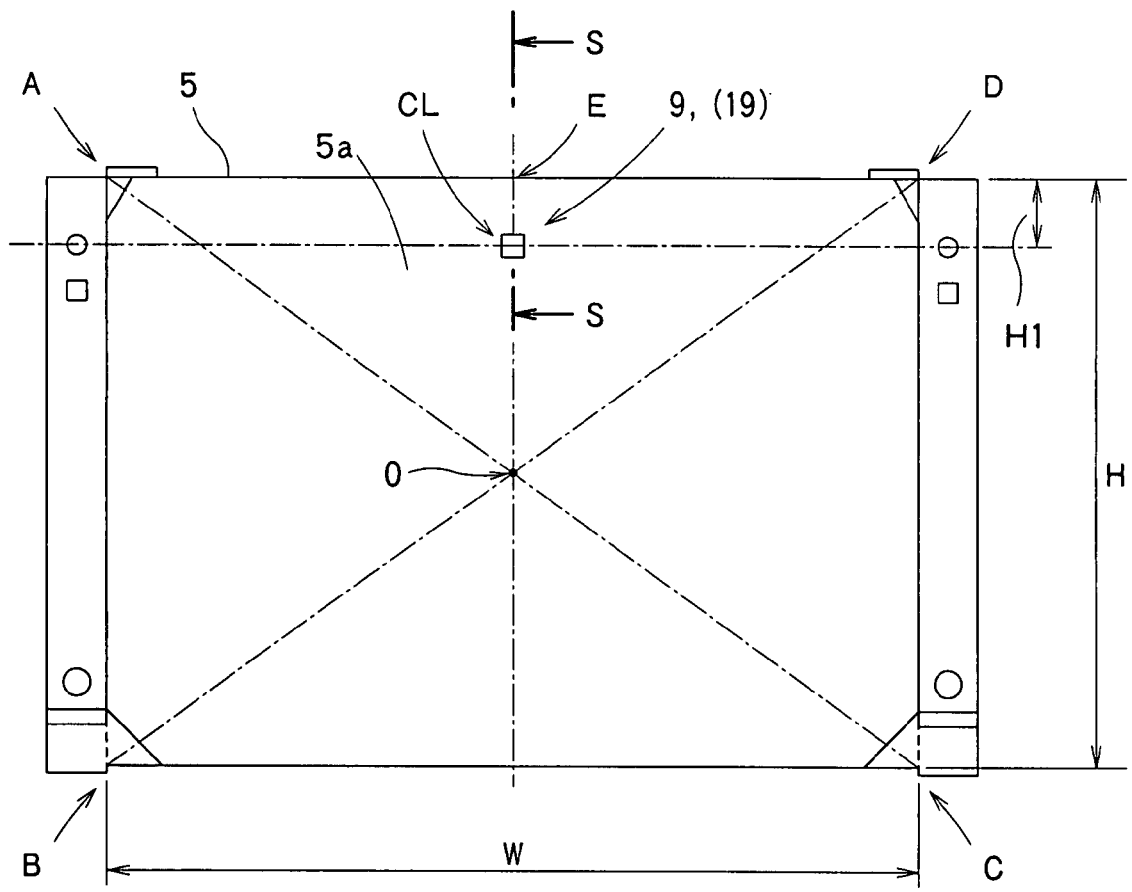
FIG. 3 shows a front view illustrating the first embodiment of the aspheric mirror according to the present invention.

As shown in FIG. 3 that illustrates the aspheric mirror 5 viewed from the direction of the optical axis CL, the reflective surface 5a has a curved surface having the axis CL located on a segment EO that goes through the center O of a rectangular ABCD and at a postion on the segment EO that goes across a longer side DA.

The reflective surface 5a of the aspheric mirror 5 has, for example, about 164 mm in width W and about 100 mm in height H, with 12 mm in height H1 from the optical axis CL, in FIG. 3.

Figure 4:
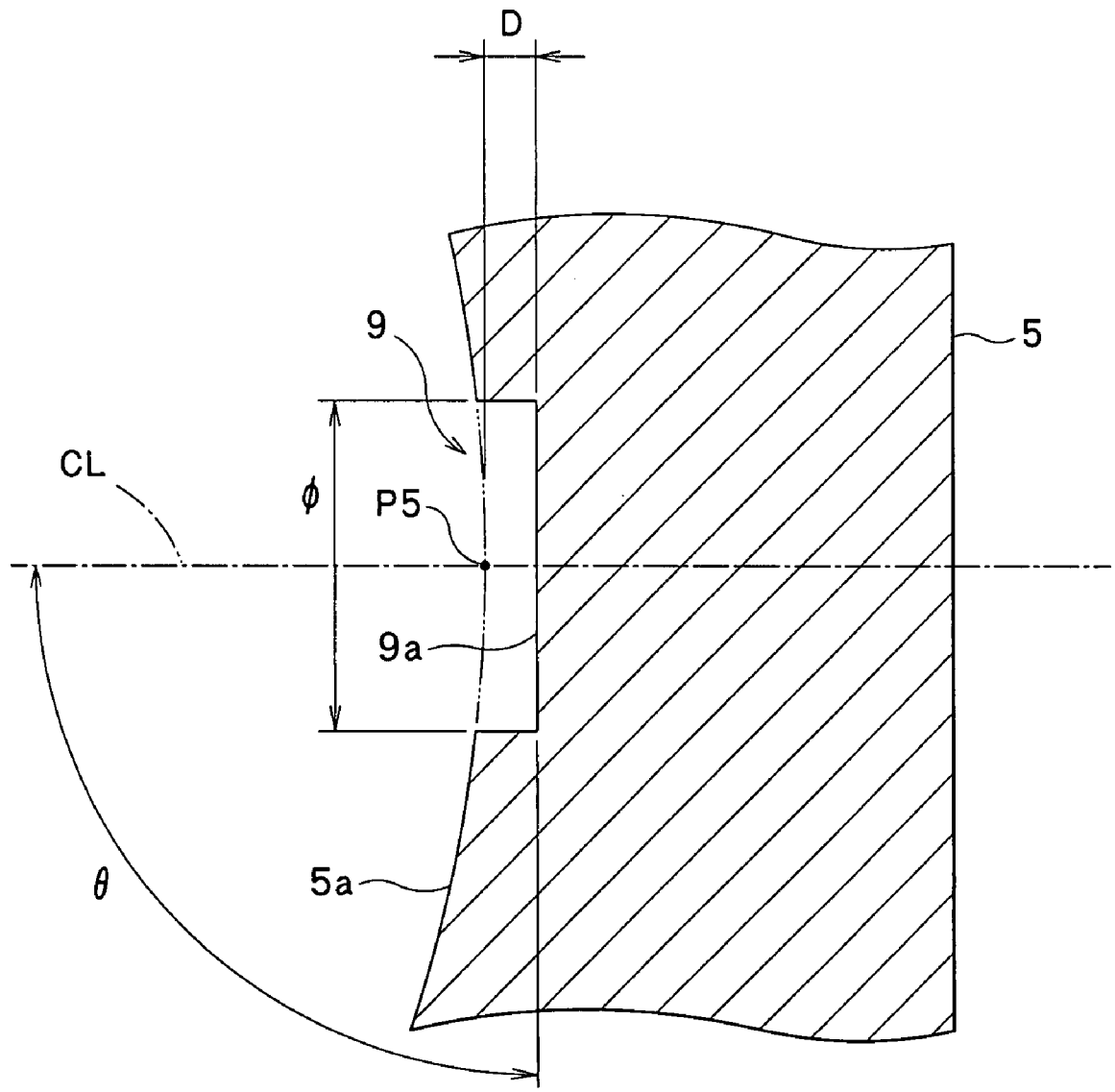
FIG. 4 shows a partial sectional view illustrating a feature of the first embodiment of the aspheric mirror according to the present invention.

Provided at a location at which the optical axis CL passes through the reflective surface 5a is a concave reference plane section 9, as shown in FIG. 4, a sectional view taken on line S-S of FIG. 3.

The reference plane section 9 is a cylindrical concave section having a diameter φ and a depth D of, for example, 4.8 mm and 0.5 mm, respectively, with a reference point P5 at which the optical axis CL passes through the reflective surface 5a when no reference plane section 9 is provided.

A bottom surface (a reference plane) 9a of the cylindrical concave section is flat having 90° in angle Θ to the optical axis CL, with surface roughness, flat enough for light emitted to the surface 9a to be reflected in almost specular reflection.

Figure 5:
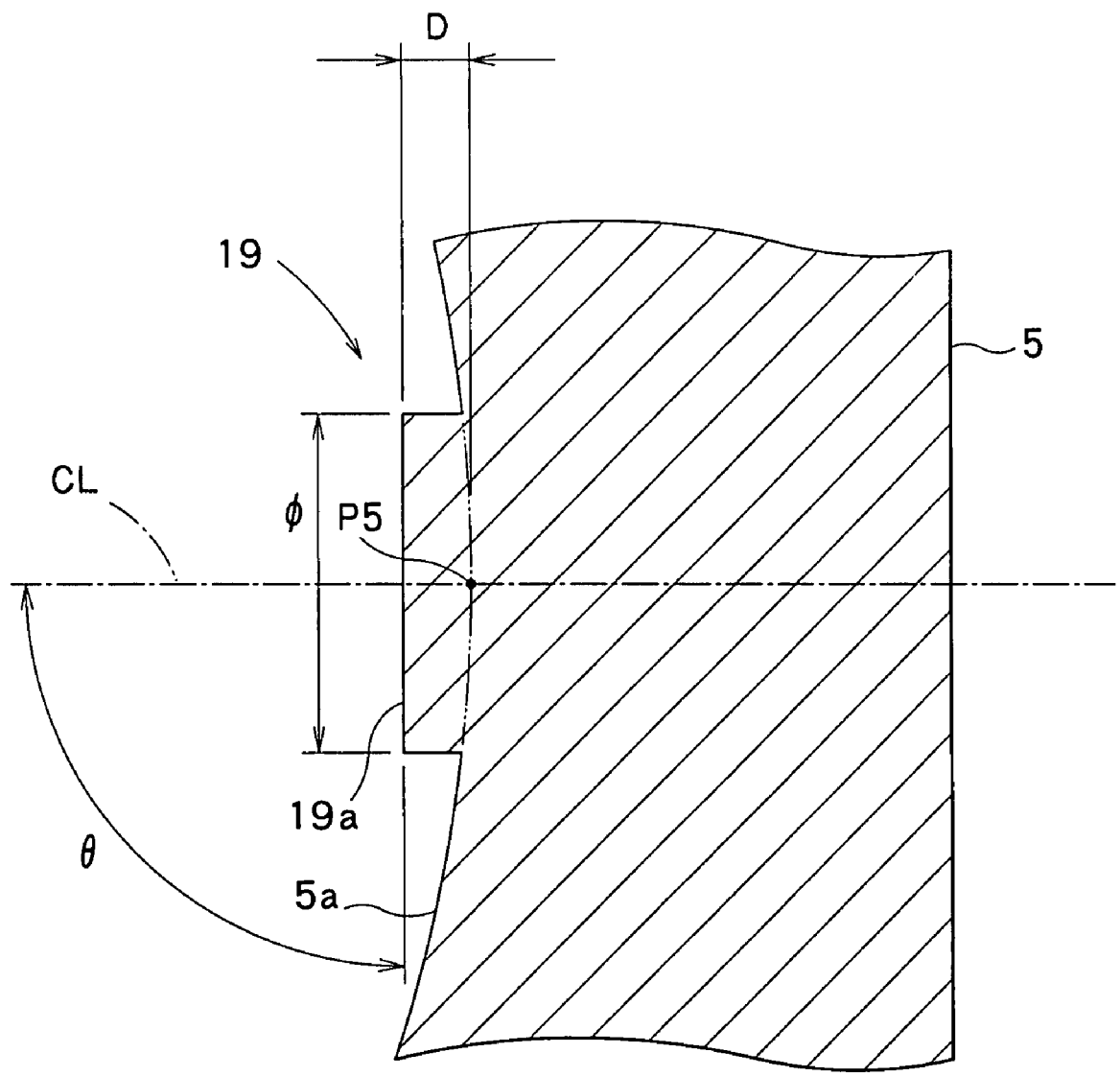
FIG. 5 shows a partial sectional view illustrating a modification to the feature shown in FIG. 4 in the first embodiment of the aspheric mirror according to the present invention.

The reference plane section may be a cylindrical convex section, such as shown in FIG. 5. A reference plane section 19 shown in FIG. 5 is a cylindrical convex section having a diameter φ and a height D of a protrusion of, for example, 4.8 mm and 0.5 mm, respectively, with a reference point P5 at which the optical axis CL passes through the reflective surface 5a when no reference plane section 19 is provided.

The cylindrical convex section has a flat top (protruding) surface 19a (reference plane) that is parpendicular to the optical axis CL, in this embodiment, with surface roughness, flat enough for light emitted to the surface 19a to be reflected in almost specular reflection.

Either of the concave section 9 and the convex section 19 may be used when the reflective surface 5a is formed in a cutting process only. The section 9 or 19 can be formed with the surface 5a in this cutting process.

In contrast, when the reflective surface 5a is formed with mirror finishing with lapping, the concave reference plane section 9 formed with cutting is preferable to the convex reference plane section 19, so as not to be obstructive to lapping.

Figure 6:
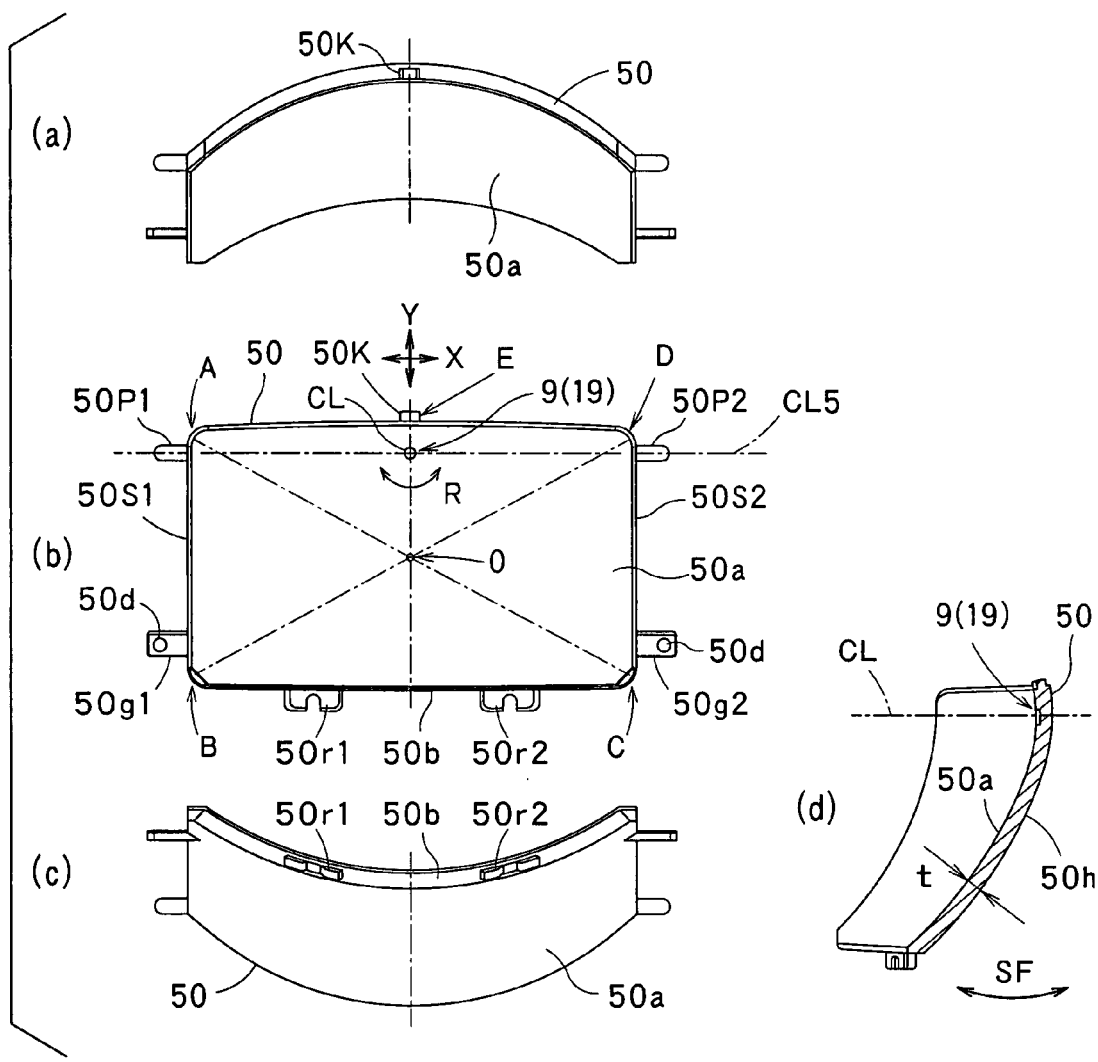
FIG. 6 shows exploded views illustrating a second embodiment of an aspheric mirror according to the present invention.

Disclosed next with reference to FIG. 6 is an aspheric mirror 50, a second embodiment of this type of mirror in this invention.

The aspheric mirror 50 is produced by resin injection molding. The mirror 50 has an aspheric reflective surface 50a having high reflectivity with a reflective film of aluminum, silver, etc., formed by deposition on a molded resin piece.

A feasible resin for injection molding is a non-transparent material, such as, polycarbonate (PC). Any other type of resin can, however, be used for injection molding.

The aspheric mirror 50 has the aspheric reflective surface 50a and a rear surface 50h with an almost uniform thickness "t", formed into a shape like a tile, or a curved piece of baked clay. The reflective surface 50a has almost the same shape as the counterpart 5a in the first embodiment.

The reflective surface 50a is a concave surface having the optical axis CL at a non-center position cut away from an aspheric surface symmetrical with respect to the optical axis CL.

As shown in (b) of FIG. 6 that illustrates the aspheric mirror 50 viewed from the direction of the optical axis CL, the reflective surface 50a has a curved surface having the axis CL located on a segment EO that goes through the center O of a rectangular ABCD and at a position on the segment EO that goes across a longer side DA.

Provided on side surfaces 50s1 and 50s2 of the aspheric mirror 50 and closer to a longer side AD of the mirror 50 are pins 50p1 and 50p2, respectively, having an axis CL5 perpendicular to the optical axis CL and parallel to the longer side AD. Also provided on the side surfaces 50s1 and 50s2 but closer to another longer side BC of the mirror 50 are brims 50g1 and 50g2, respectively, each having a hole 50d.

Provided on a bottom surface 50b of the aspheric mirror 50 are a pair of brims 50r1 and 50r2 each having a U-shaped cutaway section, as shown in (b) and (c) of FIG. 6. Provided on a top surface 50t of the mirror 50 are a protrusion 50k, as shown in (a) FIG. 6.

The aspheric mirror 50 is supported by the supporting base 8, like the counterpart 5 as shown in FIG. 1, with the pins 50p1 and 50p2, the brims 50g1 and 50g2 (with the holes 50d), the protrusion 50k, and the brims 50r1 and 50r2.

The aspheric mirror 50 is supported by the supporting base 8 which is achieved by a known supporting mechanism in which the mirror 50 is rotatable about an optical axis CL in directions of R, movable in vertical and horizontal directions X and Y, as shown in (b) of FIG. 6, and also tiltable in directions SF, as shown in (d) of FIG. 6, within a specific range in each direction, and mountable in an optimum position or posture, in FIG. 6.

The aspheric mirror 50 is also provided with the cylindrical-concave reference plane section 9 or the cylindrical-convex reference plane section 19 shown in FIGS. 4 and 5, respectively. The mirror 50 is produced with injection molding with no mirror finishing, which allows the reference plane section to be either of concave and convex. The reference plane sections 9 and 19 are provided with the bottom surface 9a and the flat top (protruding) surface 19a, respectively, perpendicular to the optical axis CL (Θ=90°), with surface roughness, flat enough for light emitted to the surface 9 (19a) to be reflected in almost specular reflection.

Disclosed next is a method of producing a projection-type image displaying apparatus according to the present invention, with installation of the aspheric mirror 5 or 50 and determination of the location and posture thereof.

Figure 7:
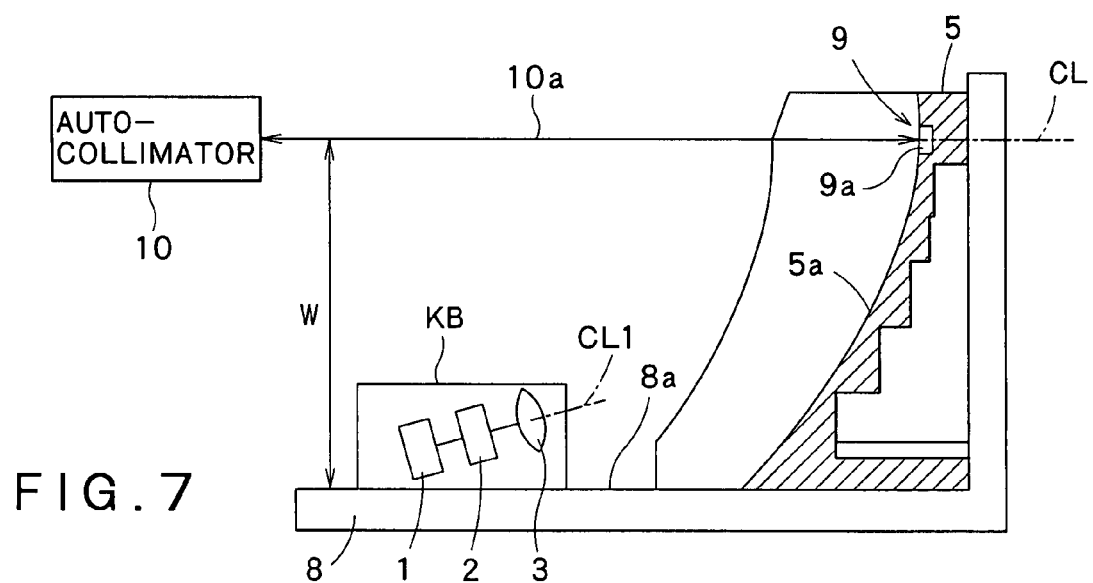
FIG. 7 shows a schematic illustration of a production method for the projection-type image displaying apparatus according to the present invention.

FIG. 7 illustrates such a method for the aspheric mirror 5, which is also applicable to the aspheric mirror 50.

Firstly, the optical block KB is fixed on a reference plane 8a of the supporting base 8 at a specific location and a specific posture according to the specification, in a known way.

It depends on the specification whether the optical axis CL1 of the block KB is adjusted as parallel to the reference plane 8a (FIG. 1) or not (FIG. 7).

The aspheric mirror 5 is placed in a roughly specific location and temporarily fixed with a known supporting mechanism (not shown) in which the mirror 5 is rotatable about an optical axis CL in directions of R, movable in vertical and horizontal directions X and Y, and tiltable in directions SF, within a specific range in each direction, and mountable in an optimum position or posture, as explained with reference to FIG. 2.

A light beam 10a is emitted from an autocollimator 10 to the reference plane section 9 of the aspheric mirror 5. In detail, the beam 10 is emitted in a direction parallel to the reference plane 8a of the supporting base 8 with a specific height W from the plane 8a and perpendicular to a plane that involves the optical axis CL1 of the optical block KB and is vertical to the plane 8a so that an axis of the beam 10 agrees with an optical axis CL given in design for the mirror 5.

The light beam 10a is reflected from the bottom surface 9a of the reference plane section 9, as having beam components reflected in almost specular reflection. The inclination of the surface 9a is measured based on the almost specular-reflected components. The position and posture of the aspheric mirror 5 are adjusted so that there is no inclination for the surface 9a), or the optical axis CL of the temporarily-fixed mirror 5 agrees with the optical axis CL given in design. The mirror 5 is then completely fixed at the position and posture with no inclination of the surface 9a.

In summary, the method disclosed above is to emit a light beam to the bottom surface 9a that is the plane perpendicular to the optical axis CL of the aspheric mirror 5 so that the axis of the beam agrees with an optical axis given design, for optical-axis adjustments with beam components reflected from the surface 9a almost in specular reflation, and to fix the mirror 5 on the reference plane 8a that is the common plane for the mirror 5 and the optical block KB.

Accordingly, this method offers an easy installation operation with positional and posture adjustments to the aspheric mirror 5 without projecting images onto the screen 6 (FIG. 1). Moreover, the method achieves mirror adjusting and fixing operations without the screen 6 and the housing 49.

The adjustments are simple because the posture adjustments to the aspheric mirror 5 can be done with the autocollimator 10, which achieves highly precise positional and posture adjustments to the mirror 5 in mirror installation.

Therefore, the method disclosed above can be preferably applied to production of projection-type image displaying apparatuses, with simple processes, thus giving high quality to projected images with almost no distortion and non-uniform resolution.

Moreover, the method allows an easier inspection operation to examine whether the reflective surface of the aspheric mirror 5 has a surface shape formed within specifications.

The inspection operation is performed with a three-dimensional measuring instrument. This is an extremely difficult operation for a known aspheric mirror with no reference plane section. Because it is difficult to determine a best position and posture at which measured three-dimensional data are to be checked against three-dimensional data given in design. This is because the reflective surface of the known mirror has no reference plane.

In detail, check is made between measured three-dimensional data and three-dimensional data given in design at a specific interval over the reflective surface of the known aspheric mirror, to obtain each difference between the measured data and the data given in design. Obtained next is a reference mirror posture at which the smallest total of the differences is given. The reflective surface is then evaluated for its surface quality based on the checked data at the reference mirror posture.

This is a very burdensome procedure. In addition, the accuracy of the reference mirror posture might not be high due to possibly unreliable data checking.

In contrast, the aspheric mirror 5 (50) having the reference plane section 9 (19) in the reflective surface allows simple and accurate mirror positional and posture adjustments with the bottom surface 9a (the protruding surface 19a) as the reference plane, in this invention. The three-dimensional data checking discussed above can be done at the adjusted position and posture, which is a highly simple and reliable checking operation.

As disclosed above in detail, the aspheric mirrors 5 and 50 having the concave and convex reference plane sections 9 and 19, respectively, can be installed in the same way with the same advantages.

Figure 8:
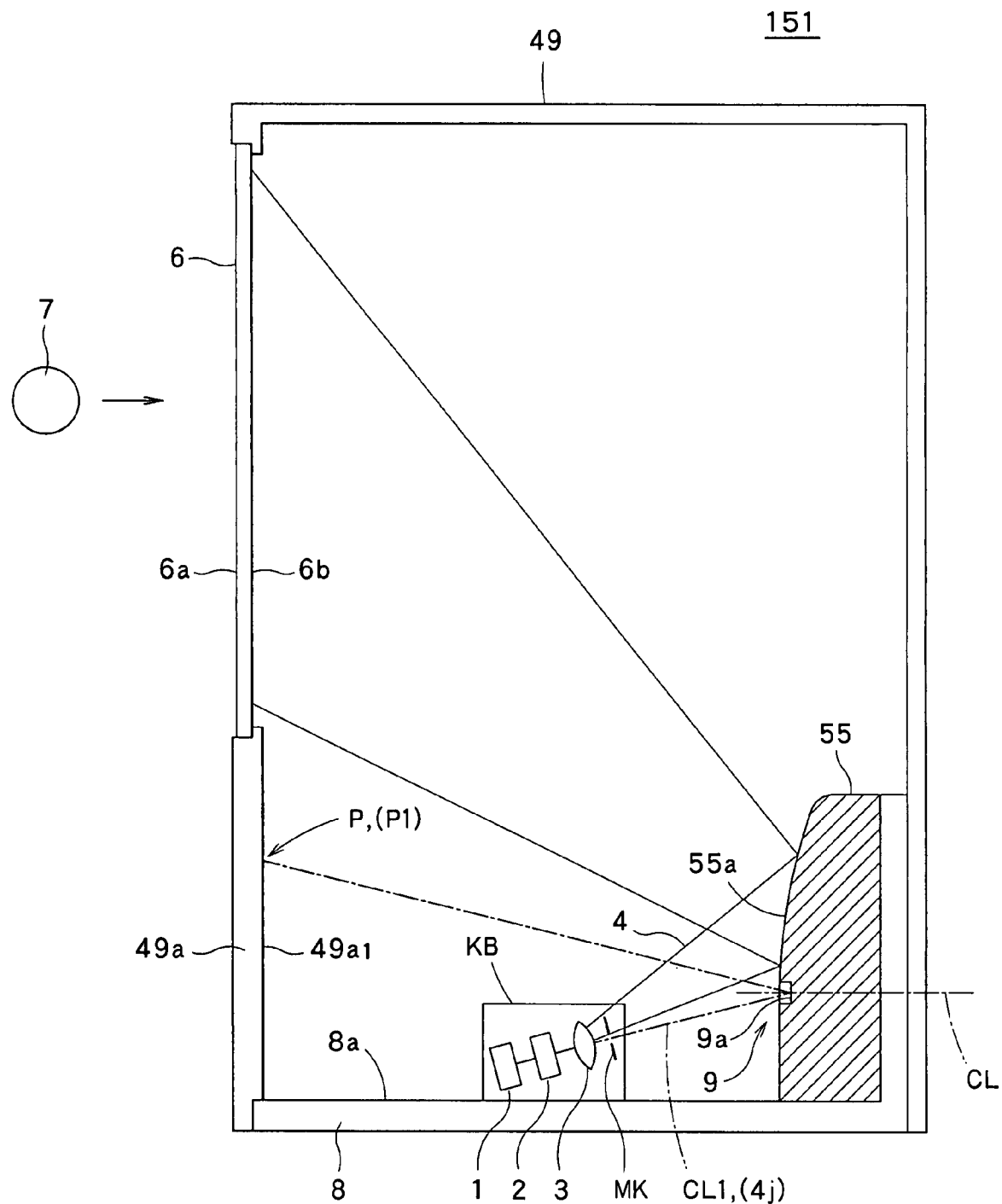
FIG. 8 shows a schematic illustration of an embodiment of a projection-type image displaying apparatus according to the present invention, equipped with an aspheric mirror having a convex reflective surface.

Disclosed next with reference to FIG. 8 is a projection-type image displaying apparatus 151 having a convex aspheric mirror 55, another preferred embodiment according to the present invention.

The difference between the embodiments shown in FIGS. 1 and 8 is the shape of the reflective surface of the aspheric mirrors 5 (50) and 55. The other components are basically the same as each other, with the same reference numerals given.

A fan beam 4 emitted from an optical block KB reaches a convex reflective surface 55a formed on an aspheric surface of the mirror 55, a section of a convex surface, and reflected therefrom. The reflected beam 4 is projected onto a rear side 6b of a screen 6 (the right side surface of the screen 6 in FIG. 8), with an enlarged image displayed thereon. The convex reflective surface 55a gives an enlarged image without reversal between left and right and top and bottom on the rear side 6b of the screen 6. A viewer 7 views the enlarged image at a front side 6a of the screen 6.

The reflective surface 55a is a convex surface having an optical axis CL at a non-center position cut away from an aspheric surface symmetrical with respect to the optical axis CL.

In the aspheric mirror 55, provided at a location at which the optical axis CL passes through the reflective surface 55a is a reference plane section 9 having a cylindrical concave, like the counterpart 5 shown in FIG. 4. The reference plane section may have a cylindrical convex, like the reference plane section 19 shown in FIG. 5.

The aspheric mirror 55 can be installed with the help of an autocollimator, like the first embodiment. In the same way as explained above, a light beam is emitted from the autocollimator to the bottom surface 9a of the reference plane section 9 so that the axis of the beam agrees with the optical axis CL given in design, thus having beam components reflected from the surface 9a in almost specular reflection. The beam components are used in optical-axis adjustments for fixing the mirror 55 on a reference plane 8a of a supporting base 8 that is the common plane for the mirror 55 and the optical block KB.

Disclosed next is another method of producing a projection-type image displaying apparatus according to the present invention with installation of the aspheric mirror 55.

Decided first are positions of the optical block KB and the aspheric mirror 55 relative to each other so that an optical axis CL1 of the optical block KB intersects with the bottom surface 9a of the reference plane section 9, thus a light beam emitted from the block KB along the axis CL1 reaching an inner surface 49a1 of a front panel 49a of a housing 49, after reflected from the surface 9a.

With mounting of the aspheric mirror 55 on the support base 8, a mask MK is situated in front of an optical lens 3 in the optical block KB so that light beams emitted from the block KB through the mask MK are only a bundle of light beams that go forward in a small zone involving the optical axis CL1.

Among the bundle of light beams emitted from the optical block KB and going along the optical axis CL1 is an axial light beam 4*j*. The beam 4*j* is reflected from the bottom surface 9*a* of the reference plane section 9 in almost specular reflection and reaches the inner surface 49*a*1 of the front panel 49*a* of the housing 49, thus forming a light spot at a position P1.

The position and posture of the aspheric mirror 55 are then adjusted so that the position P1 of the light spot agrees with a reference position P given in design for the mirror 55 and situated in location according to the specification, thus the mirror 55 being installed at a highly precise position and posture.

Accordingly, this method allows positioning of the aspheric mirror 55, with the mask in front of the optical lens 3 in the optical block KB, instead of the autocollimator 10, thus achieving simpler and more accurate installation of the mirror 55.

The aspheric mirror 55 shown in FIG. 8 may be a concave mirror instead of the convex mirror described above.

As disclosed above, for the aspheric mirror 5 (the first embodiment) cut from a lump of metal, the reflective surface 5*a* and the reference plane of the reference plane section 9 or 19 can be formed in the same processing step without varying a position (or a posture) of a chuck to the workpiece, with high accuracy for the relative positional relationship between the reflective surface and reference plane.

Also, for the aspheric mirror 50 (the second embodiment) produced by resin injection molding, the reflective surface 50*a* and the reference plane of the reference plane section 9 or 19 can be formed in the same processing step without varying a position (or a posture) of a chuck to the workpiece, with high accuracy for the relative positional relationship between the reflective surface and reference plane.

The position and posture of the reference plane formed as disclosed above are adjusted according to the specification with measurements based on a light beam emitted to and reflected from the reference plane in almost specular reflection.

Therefore, the aspheric mirror according to the present invention can be installed with precise positioning. Moreover, a projection-type image displaying apparatus equipped with the aspheric mirror gives high quality to images with almost no distortion and non-uniform resolution.

The embodiments disclosed above can be modified with changing the components, the order of process steps, etc., within the scope of the present invention.

For example, the concave and convex reference plane sections 9 and 19 shown in FIGS. 4 and 5, respectively, may be rectangular, conic, etc., instead of cylindrical.

The reference plane may lie in the surface that involves the reference point P5, already discussed with reference to FIG. 4 or 5, that is an intersection of the optical axis CL and the reflective surface 5*a*, 50*a* or 55*a*.

The reference plane 9*a* (the bottom surface) and the reference plane 19*a* (the flat top protruding surface) may not be the plane perpendicular to the optical axis CL, as shown in FIGS. 4 and 5, respectively. It may be the plane having an angle Θ to the optical axis CL.

Since a very precise angle Θ can be given through the mirror-production methods discussed above, accurate positioning is achieved with a light beam emitted from the autocollimator 10 to the reference plane 9*a* or 19*a* at an angle (90°−Θ) to the optical axis CL.

Nevertheless, it is preferable to have the reference planes 9*a* and 19*a* being perpendicular to the optical axis CL. This is because it is the easiest way in mirror production to form the reference plane as the plane perpendicular to the optical axis CL that is the reference for the shape of the reflective surface.

The reference plane sections 9 and 19 having the reference plane 9*a* (the bottom surface) and the reference plane 19*a* (the flat top protruding surface), respectively, may lie in a surface section of the mirror 5, 50 or 55, which does not intersect with the optical axis CL.

Nevertheless, it is preferable to have the reference plane section 9 or 19 lying in a surface section of the mirror 5, 50 or 55, which intersects with the optical axis CL so that the reference plane 9*a* or 19*a* can be formed in the same process step as the reflective surface 5*a*, 50*a* or 55*a*.

Moreover, in addition to the reference plane 9*a* or 19*a* having the optical axis CL going therethrough, one or more of reference planes may be provided as distant from the axis CL, which achieves positioning with the autocollimator 10 to a plurality of reference planes.

A light beam to be emitted to the reference plane 9*a* or 19*a* in positioning, may be any type of light beam, such as, a visible light beam, an invisible light beam (infrared rays, ultra-violet rays, etc.) and a laser beam.

As disclosed above in detail, the aspheric mirror having the reference plane according to the present invention can be precisely mounted at a desired location and angle with less variation.

Moreover, the projection-type image displaying apparatus according to the present invention can be equipped with the aspheric mirror having the reference plane precisely mounted at a desired location and angle with less variation, thus giving high quality to projected images.

What is claimed is:

1. An aspheric mirror comprising:
    an aspheric reflective first surface having a first optical axis along which a first beam is to be emitted to the reflective first surface; and
    an aspheric second surface that is formed continuous with the reflective first surface to constitute an aspheric surface and that is symmetrical with respect to a second optical axis that goes through a center of the second surface and that is not parallel with the first optical axis, the second surface being connected to a section that extends to a bottom surface,
    wherein the bottom surface acts as a reference plane with respect to a second beam to be emitted along the second optical axis to the second surface.

2. The aspheric mirror according to claim 1 wherein the second optical axis goes through the aspheric surface constituted by the first and second surfaces at a non-center position on the aspheric surface constituted by the first and second surfaces.

3. The aspheric mirror according to claim 1 wherein the bottom surface is perpendicular to the second optical axis.

4. The aspheric mirror according to claim 1 wherein the bottom surface is flat enough for a beam to be reflected from the bottom surface in almost specular reflection when emitted to the bottom surface.

5. A projection-type image displaying apparatus comprising:
    an optical block to emit a first beam carrying an image through optical modulation;
    an aspheric mirror having an aspheric reflective surface having a first optical axis along which the first beam is emitted to the reflective first surface; and
    an aspheric second surface that is formed continuous with the reflective first surface to constitute an aspheric surface and that is symmetrical with respect to a second optical axis that goes through the second surface and that is not parallel with the first optical axis, the second surface being connected to a section that extends to a bottom surface, wherein the bottom surface acts as a reference plane with respect to a second beam to be emitted along the second optical axis to the second surface, the optical block and the mirror being arranged for the first beam to be emitted to and reflected from the reflective first surface; and a screen to display the image carried by the beam reflected from the reflective first surface.

6. The apparatus according to claim 5 wherein the second optical axis goes through the aspheric surface constituted by the first and second surfaces at a non-center position on the aspheric surface constituted by the first and second surfaces.

7. The aspheric mirror according to claim 5 wherein the bottom surface is perpendicular to the second optical axis.

8. The aspheric mirror according to claim 5 wherein the bottom surface is flat enough for a beam to be reflected from the bottom surface in almost specular reflection when emitted to the bottom surface.

* * * * *